(12) United States Patent
Hu et al.

(10) Patent No.: US 10,803,818 B2
(45) Date of Patent: Oct. 13, 2020

(54) PIXEL ARCHITECTURE, DISPLAY SUBSTRATE, AND DISPLAY

(71) Applicant: HKC CORPORATION LIMITED, Shenzhen, Guangdong (CN)

(72) Inventors: Shuixiu Hu, Guangdong (CN); Dongsheng Guo, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/312,793

(22) PCT Filed: Nov. 20, 2018

(86) PCT No.: PCT/CN2018/116321
§ 371 (c)(1),
(2) Date: Dec. 21, 2018

(87) PCT Pub. No.: WO2020/082474
PCT Pub. Date: Apr. 30, 2020

(65) Prior Publication Data
US 2020/0135123 A1 Apr. 30, 2020

(30) Foreign Application Priority Data
Oct. 24, 2018 (CN) .......................... 2018 1 1241183

(51) Int. Cl.
*G09G 3/36* (2006.01)
*G02F 1/1362* (2006.01)
*G02F 1/1368* (2006.01)

(52) U.S. Cl.
CPC ......... *G09G 3/3607* (2013.01); *G02F 1/1368* (2013.01); *G02F 1/136286* (2013.01); *G02F 2001/136222* (2013.01); *G09G 2300/0426* (2013.01); *G09G 2300/0452* (2013.01)

(58) Field of Classification Search
CPC ... G09G 2300/0452; G09G 2300/0426; G09G 3/3607; G02F 1/136286; G02F 1/1368; G02F 2001/136222
See application file for complete search history.

(56) References Cited

U.S. PATENT DOCUMENTS

| | | | | |
|---|---|---|---|---|
| 7,916,156 B2* | 3/2011 | Brown Elliott | ...... | G09G 3/2003 345/613 |
| 2009/0251556 A1* | 10/2009 | Mabuchi | ................ | H04N 5/363 348/222.1 |
| 2011/0260952 A1* | 10/2011 | Hwang | ............... | H01L 27/3218 345/55 |
| 2013/0128166 A1* | 5/2013 | Chiang | ................ | G09G 3/3659 349/38 |

(Continued)

Primary Examiner — Michael Le (57) ABSTRACT

A pixel architecture includes a plurality of pixel cell groups disposed in parallel in a row direction. Each pixel cell group includes a plurality of pixel cells disposed in parallel in a column direction. Each pixel cell includes one first sub-pixel and two second sub-pixels. The first sub-pixels in a same pixel cell group are disposed adjacently in sequence in the column direction. The second sub-pixels in a same pixel cell group are disposed adjacently in sequence in the column direction. In a same pixel cell group, one second sub-pixel in each pixel cell and another second sub-pixel that is in another adjacent pixel cell and is adjacent to the second sub-pixel have a same color.

17 Claims, 4 Drawing Sheets (56) References Cited

U.S. PATENT DOCUMENTS

| | | | | |
|---|---|---|---|---|
| 2014/0204008 A1* | 7/2014 | Chu-Ke | ............... | G09G 3/2003 |
| | | | | 345/88 |
| 2014/0292622 A1* | 10/2014 | Lee | ...................... | G09G 3/3233 |
| | | | | 345/80 |
| 2016/0358985 A1* | 12/2016 | Bai | ...................... | G09G 3/3208 |
| 2017/0132969 A1* | 5/2017 | Guo | ................... | H01L 27/3218 |
| 2019/0129258 A1* | 5/2019 | Liu | ...................... | G02F 1/1368 |

\* cited by examiner

PIXEL ARCHITECTURE, DISPLAY SUBSTRATE, AND DISPLAY

CROSS-REFERENCE TO RELATED APPLICATIONS

This application is the International Application No. PCT/CN2018/116321 for entry into US national phase with an international filing date of Nov. 20, 2018, designating US, now, and claims priority to Chinese Patent Application No. 201811241183.0, filed on Oct. 24, 2018, the content of which is incorporated herein by reference in its entirety.

BACKGROUND

Technical Field

This application relates to the technical field of display, and in particular, to a pixel architecture, a display substrate, and a display.

Related Art

The description herein provides only background information related to this application, and does not necessarily constitute the prior art.

Various colors displayed in a frame of a thin film transistor liquid crystal display (TFT-LCD) are displayed by using a pixel architecture in a panel. In an exemplary technology, a pixel architecture generally includes a red display region, a green display region, and a blue display region, and the red display region, the green display region, and the blue display region all are rectangles with a same shape and size; in a row direction, the red display region, the green display region, and the blue display region are arranged in sequence from left to right; in a column direction, a plurality of red display regions, a plurality of green display regions, and a plurality of blue display regions are arranged in sequence from top to bottom; and the red display region, the green display region and the blue display region adjacent in the row direction form a pixel cell, such that frames with various colors can be displayed according to a color-mixing effect of human eyes.

In the foregoing pixel architecture, geometric centers of the red display region, the green display region and the blue display region in a same pixel cell are located on a same straight line, and distances between any two of the geometric centers are not equal. As a result, the red light, the green light, and the blue light in the same pixel cell enter human eyes by different distances, causing a reduced color combination effect of human eyes and a relatively large color difference between a frame seen by human eyes and an actual frame.

SUMMARY

One objective of this application is to provide a pixel architecture, so as to achieve effects that include, but is not limited to, an effect of reducing or avoiding a phenomenon in which red light, green light, and blue light from a same pixel cell enter human eyes from different distances, causing an undesirable color combination effect of human eyes and a relatively large color difference between a picture seen by human eyes and an actual picture.

A technical solution used in embodiments of this application is as follows: A pixel architecture includes:

a plurality of pixel cell groups, disposed in parallel in a row direction;

each pixel cell group including:

a plurality of pixel cells, disposed in parallel in a column direction perpendicular to the row direction, where each pixel cell includes one first sub-pixel and two second sub-pixels;

the color of the first sub-pixel and the color of each second sub-pixel are different from each other in the pixel cell, and the colors of the two second sub-pixels in the pixel cell are different from each other;

the first sub-pixels in a same pixel cell group are disposed adjacently in sequence in the column direction;

the second sub-pixels in a same pixel cell group are disposed adjacently in sequence in the column direction; and in a same pixel cell group, one second sub-pixel in each pixel cell and another second sub-pixel that is in another adjacent pixel cell and is adjacent to the second sub-pixel have a same color.

Optionally, in a same pixel cell, the color of the first sub-pixel is red, and the colors of the two second sub-pixels are green and blue.

Optionally, an area ratio of the first sub-pixel to the second sub-pixel is 2:1.

Optionally, the shape of the first sub-pixel is set to a regular hexagon, the shape of the second sub-pixel is set to an isosceles trapezoid, one second sub-pixel in each pixel cell and another second sub-pixel that is in another adjacent pixel cell and is adjacent to the second sub-pixel are combined into a regular hexagon, and among three regular hexagons that are disposed adjacently to each other, distances between geometric centers of any two regular hexagons are equal.

Optionally, the shape of the first sub-pixel is set to a square, the shape of the second sub-pixel is set to a rectangle, and one second sub-pixel in each pixel cell and another second sub-pixel that is in another adjacent pixel cell and is adjacent to the second sub-pixel are combined into a square.

Optionally, the shape of the first sub-pixel is set to a rhombus having a 60° angle, the shape of the second sub-pixel is set to a regular triangle, and one second sub-pixel in each pixel cell and another second sub-pixel that is in another adjacent pixel cell and is adjacent to the second sub-pixel are combined into a rhombus having a 60° angle.

Optionally, the first sub-pixel in each pixel cell in a same column direction is connected to a same data signal line through an active switch, and the second sub-pixels in each pixel cell in the same column direction are connected to another data signal line through an active switch.

Optionally, the first sub-pixel in each pixel cell in a same column direction is connected to a same data signal line through an active switch, and the second sub-pixels in each pixel cell in the same column direction are connected to another data signal line through an active switch.

This application further provides a display substrate, where a pixel architecture is used to display colors, and the pixel architecture includes:

a plurality of pixel cell groups, disposed in parallel in a row direction;

each pixel cell group including:

a plurality of pixel cells, disposed in parallel in a column direction perpendicular to the row direction, where each pixel cell includes one first sub-pixel and two second sub-pixels;

the color of the first sub-pixel and the color of each second sub-pixel are different from each other in the pixel cell, and the colors of the two second sub-pixels in the pixel cell are different from each other;

the first sub-pixels in a same pixel cell group are disposed adjacently in sequence in the column direction;

the second sub-pixels in a same pixel cell group are disposed adjacently in sequence in the column direction; and in a same pixel cell group, one second sub-pixel in each pixel cell and another second sub-pixel that is in another adjacent pixel cell and is adjacent to the second sub-pixel have a same color.

Optionally, in a same pixel cell, the color of the first sub-pixel is red, and the colors of the two second sub-pixels are green and blue.

Optionally, an area ratio of the first sub-pixel to the second sub-pixel is 2:1.

Optionally, the shape of the first sub-pixel is set to a regular hexagon, the shape of the second sub-pixel is set to an isosceles trapezoid, one second sub-pixel in each pixel cell and another second sub-pixel that is in another adjacent pixel cell and is adjacent to the second sub-pixel are combined into a regular hexagon, and among three regular hexagons that are disposed adjacently to each other, distances between geometric centers of any two regular hexagons are equal.

Optionally, the first sub-pixel in each pixel cell in a same column direction is connected to a same data signal line through an active switch, and the second sub-pixels in each pixel cell in the same column direction are connected to another data signal line through an active switch.

Optionally, the first sub-pixel and one second sub-pixel in each pixel cell in a same row direction are connected to a same switch signal line through an active switch, and the other second sub-pixel in each pixel cell in the same row direction is connected to another switch signal line through an active switch.

This application further provides a display, including a display substrate, where the display substrate uses a pixel architecture to display colors, and the pixel architecture includes:

a plurality of pixel cell groups, disposed in parallel in a row direction;

each pixel cell group including:

a plurality of pixel cells, disposed in parallel in a column direction perpendicular to the row direction, where each pixel cell includes one first sub-pixel and two second sub-pixels;

the color of the first sub-pixel and the color of each second sub-pixel are different from each other in the pixel cell, and the colors of the two second sub-pixels in the pixel cell are different from each other;

the first sub-pixels in a same pixel cell group are disposed adjacently in sequence in the column direction;

the second sub-pixels in a same pixel cell group are disposed adjacently in sequence in the column direction; and in a same pixel cell group, one second sub-pixel in each pixel cell and another second sub-pixel that is in another adjacent pixel cell and is adjacent to the second sub-pixel have a same color.

Optionally, in a same pixel cell, the color of the first sub-pixel is red, and the colors of the two second sub-pixels are green and blue.

Optionally, an area ratio of the first sub-pixel to the second sub-pixel is 2:1.

Optionally, the shape of the first sub-pixel is set to a regular hexagon, the shape of the second sub-pixel is set to an isosceles trapezoid, one second sub-pixel in each pixel cell and another second sub-pixel that is in another adjacent pixel cell and is adjacent to the second sub-pixel are combined into a regular hexagon, and among three regular hexagons that are disposed adjacently, distances between geometric centers of any two regular hexagons are equal.

Optionally, the first sub-pixel in each pixel cell in a same column direction is connected to a same data signal line through an active switch, and the second sub-pixels in each pixel cell in the same column direction are connected to another data signal line through an active switch.

Optionally, the first sub-pixel and one second sub-pixel in each pixel cell in a same row direction are connected to a same switch signal line through an active switch, and the other second sub-pixel in each pixel cell in the same row direction is connected to another switch signal line through an active switch.

For the pixel architecture, the display substrate, and the display provided in the embodiments of this application, light rays that are emitted separately by three sub-pixels in a same pixel cell can enter human eyes from a same distance and a same angle, so that a color combination effect of human eyes is improved, and a color difference between a picture seen by human eyes and an actual picture is reduced.

BRIEF DESCRIPTION OF THE DRAWINGS

To describe the technical solutions in the embodiments of this application more clearly, the following briefly introduces the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DETAILED DESCRIPTION

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

It should be noted that when an element is referred to as being "fixed" to or "disposed" on another element, it can be directly on another element or indirectly on the another element. When an element is referred to as being "connected" to another element, it can be directly or indirectly connected to another element. Orientation or position relationships indicated by the terms such as "on", "below", "left", and "right" and the like are based on orientation or position relationships shown in the accompanying drawings, and are used only for ease of illustration description, rather than indicating or implying that the mentioned apparatus or component must have a particular orientation or must be constructed or operated in a particular orientation. Therefore, such terms should not be construed as limiting of this patent. A person of ordinary skill in the art can understand the specific meaning of these terms according to specific situations. The terms such as "first" and "second" are used only for the purpose of description, and should not be understood as indicating or implying the relative importance or implicitly specifying the number of the indicated technical features, and "a plurality of" means two or more, unless otherwise specified.

In addition, for ease of understanding of the directions described in the embodiments, in the embodiments and the accompanying drawings, the row direction is a straight-line direction (that is, the X direction in FIG. 1 to FIG. 3) in space, and the column direction is another straight-line direction (that is, the Y direction in FIG. 1 to FIG. 3) perpendicular to the row direction in space.

Figure 1:
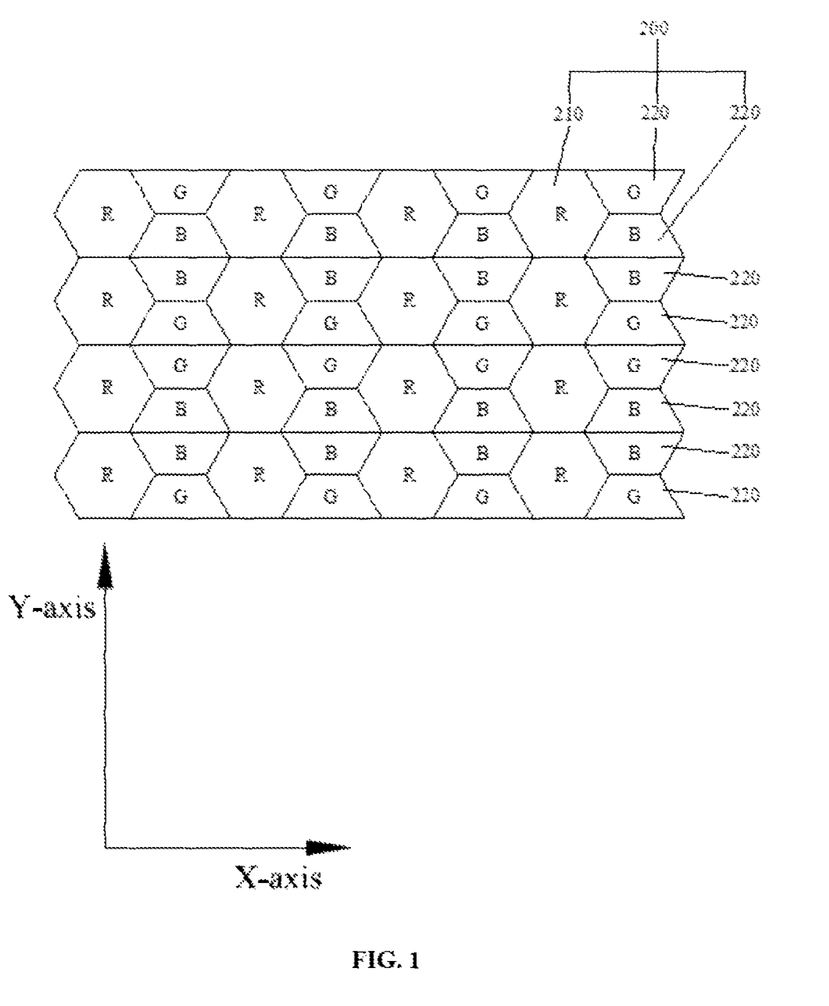
FIG. 1 is a schematic diagram of a pixel architecture according to an embodiment of this application.
Figure 2:
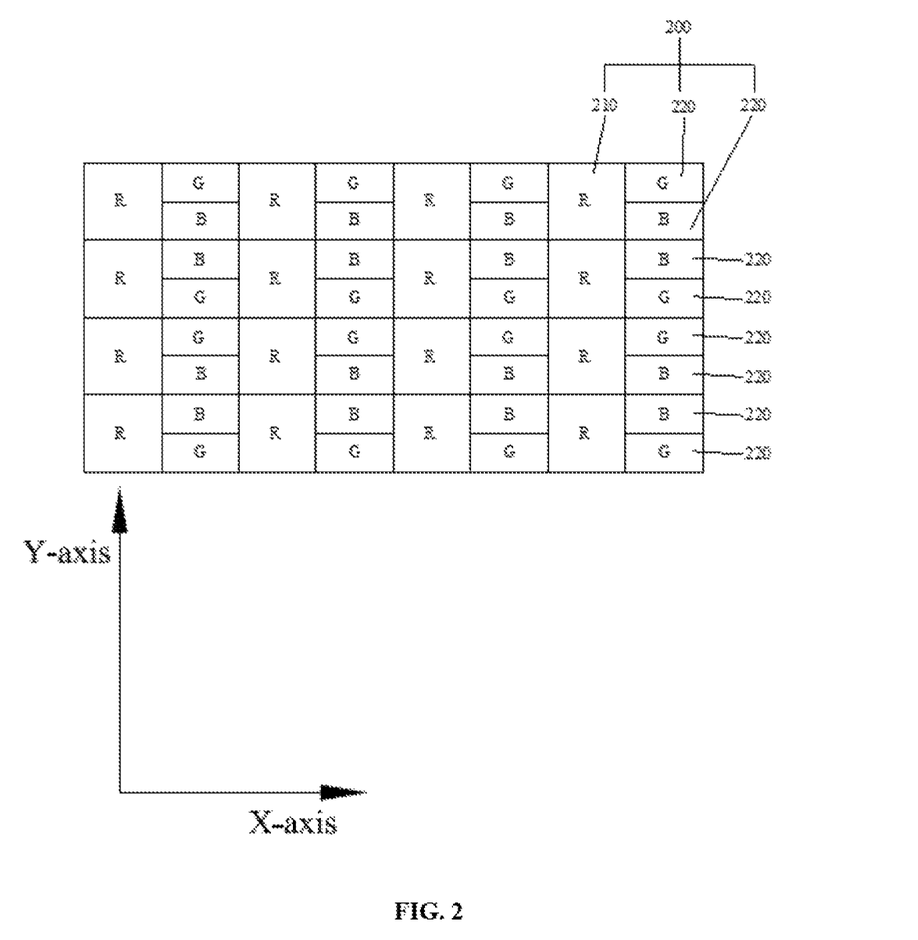
FIG. 2 is another schematic diagram of a pixel architecture according to an embodiment of this application.
Figure 3:
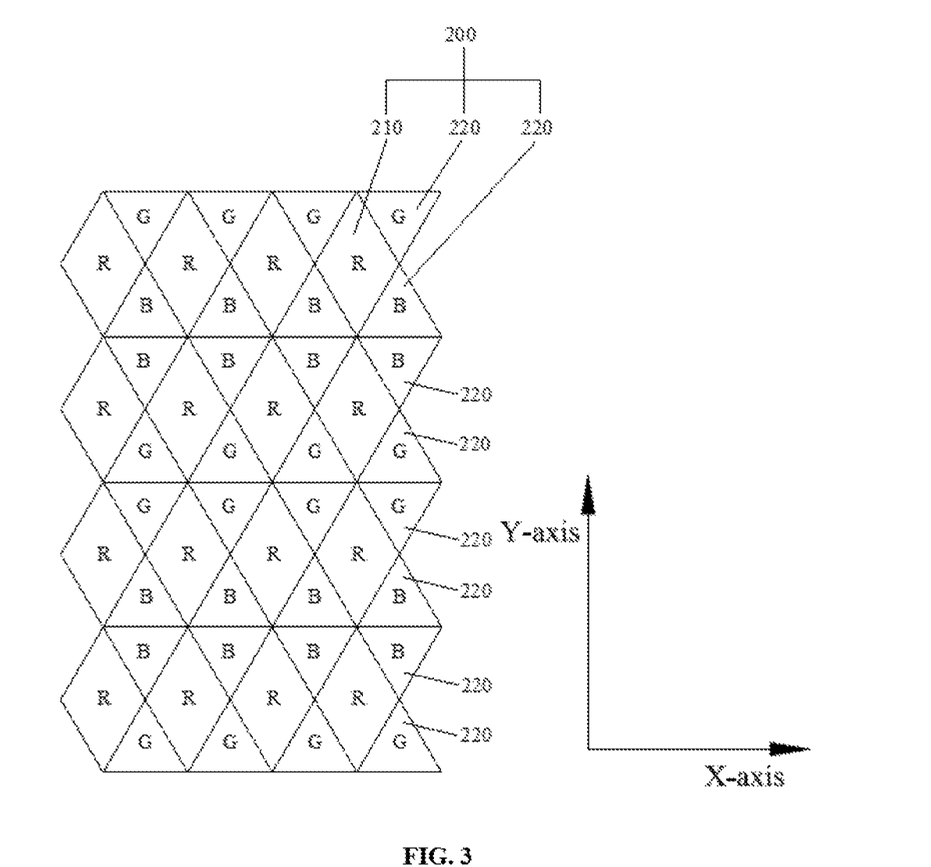
FIG. 3 is still another schematic diagram of a pixel architecture according to an embodiment of this application.

An embodiment of this application provides a pixel architecture. As shown in FIG. 1 to FIG. 3, the pixel architecture includes a plurality of pixel cell groups disposed in parallel in the row direction, and each of the pixel cell groups includes a plurality of pixel cells 200 disposed in parallel in the column direction, and each of the pixel cells 200 includes one first sub-pixel 210 and two second sub-pixels 220. Generally, the pixel cells 200 in the pixel architecture are in an array arrangement, and in particular, are in a rectangular array arrangement, so that the plurality of pixel cells 200 are disposed in parallel in the row direction and are also disposed in parallel in the column direction.

In an embodiment, each of the pixel cells 200 includes three sub-pixels, namely, one first sub-pixel 210 and two second sub-pixels 220. The colors of the three sub-pixels are respectively one of red (R), green (G) and blue (B), and are different from each other. In this embodiment, the color of the first sub-pixel 210 is set as red, and the colors of the two second sub-pixels 220 are respectively set as green and blue.

The first sub-pixels 210 in a same pixel cell group are disposed in parallel in the column direction, and the second sub-pixels 220 in a same pixel cell group are also disposed in parallel in the column direction. In a same pixel cell group, one second sub-pixel 220 in each of the pixel cells 200 has the same color with another second sub-pixel 220 in adjacent another pixel cell 200. It may also be understood that the plurality of first sub-pixels 210 may be arranged in the same column direction, and the plurality of second sub-pixels 220 may also be arranged in the same column direction. Meanwhile, in adjacent two of the pixel cells 200 in the column direction, two first sub-pixels 210 are disposed adjacently in parallel in the column direction. In adjacent two of the pixel cells 200 in the column direction, a total of four second sub-pixels 220 are disposed in parallel in the column direction. In the four second sub-pixels 220, one of the second sub-pixels 220 in one of the pixel cells 200 and one of the second sub-pixels 220 in another one of the pixel cells 200 are adjacent along the column direction and have the same color.

By the foregoing arrangement, it is not difficult to obtain that the three sub-pixels (that is, one first sub-pixel 210 and two second sub-pixels 220) in the same pixel cell 200 are not located on a same straight line, so that distances between geometric centers of any two of the three sub-pixels in the same pixel cell 200 are smaller. In this way, light rays that are emitted separately by the three sub-pixels in the same pixel cell 200 can enter human eyes by a same distance, so that a color combination effect of human eyes is improved, and a color difference between a frame seen by human eyes and an actual frame is reduced.

In an embodiment, the area ratio of the first sub-pixel 210 to the second sub-pixel 220 is 2:1.

In an embodiment, the first sub-pixels and the second sub-pixels in the same row direction are disposed alternately in the row direction. That is, in the same row direction, one first sub-pixel 210 is disposed, and then two second sub-pixels 220 arranged in the column direction are disposed, again another first sub-pixel 210 is disposed, and another two second sub-pixels 220 arranged in the column direction are disposed, and so on.

As shown in FIG. 1, the shape of the first sub-pixel 210 is set to a regular hexagon. In addition, the shape of the second sub-pixel 220 is set to an isosceles trapezoid. One second sub-pixel 220 in each pixel cell 200 and another second sub-pixel 220 that is in another adjacent pixel cell 200 and is adjacent to the second sub-pixel 220 are combined into a regular hexagon. By using the foregoing arrangement, it is not difficult to obtain that the pixel architecture generally has a cellular structure. Among three regularly hexagonal regions that are disposed adjacently between each other, and distances between geometric centers of any two regular hexagons are completely equal. This case is beneficial for a color combination effect of human eyes. The reason is that light rays that are emitted separately by three regularly hexagonal regions that are disposed adjacently to each other and represent different colors not only can enter human eyes from distances that are completely or approximately the same but also can enter human eyes from angles that are completely the same or approximately the same.

As shown in FIG. 2, the shape of the first sub-pixel 210 is set to a square. In addition, the shape of the second sub-pixel 220 is set to a rectangle. One second sub-pixel 220 in each pixel cell 200 and another second sub-pixel 220 that is in another adjacent pixel cell 200 and is adjacent to the second sub-pixel 220 are combined into a square. By using the foregoing arrangement, it is not difficult to obtain that the geometric centers of three square regions that are disposed adjacently to each other are at three vertices of an isosceles triangle. If the lengths of two legs of the isosceles triangle are set to 1, the length of the base is $(2\sqrt{5})/5$. In this case, light rays that are emitted separately by three square regions that are disposed adjacently to each other and represent different colors not only can enter human eyes from a same distance but also can enter human eyes from closer angles. In this case, the first sub-pixels 210 and the second sub-pixels 220 in a same row direction may be not disposed alternately in the row direction. That is, in the same row direction, one first sub-pixel 210 is disposed, two second sub-pixels 220 arranged in the column direction are then disposed, another two second sub-pixels 220 arranged in the column direction are then disposed, another first sub-pixel 210 is then disposed, and so on.

As shown in FIG. 3, the shape of the first sub-pixel 210 is set to a rhombus having a 60° angle. In addition, the shape of the second sub-pixel 220 is set to a regular triangle, and one second sub-pixel 220 in each pixel cell 200 and another second sub-pixel 220 that is in another adjacent pixel cell 200 and is adjacent to the second sub-pixel 220 are combined into a rhombus having a 60° angle. By using the foregoing arrangement, it is not difficult to obtain that the geometric centers of three rhombic regions that are disposed adjacently to each other are at three vertices of another isosceles triangle. If the lengths of two legs of the another isosceles triangle are set to 1, the length of the base is $(4\sqrt{5})/5$. In this case, light rays that are emitted separately by three rhombic regions that are disposed adjacently to each other and represent different colors not only can enter human eyes from distances that are completely the same but also can enter human eyes from angles that are relatively close.

Figure 4:
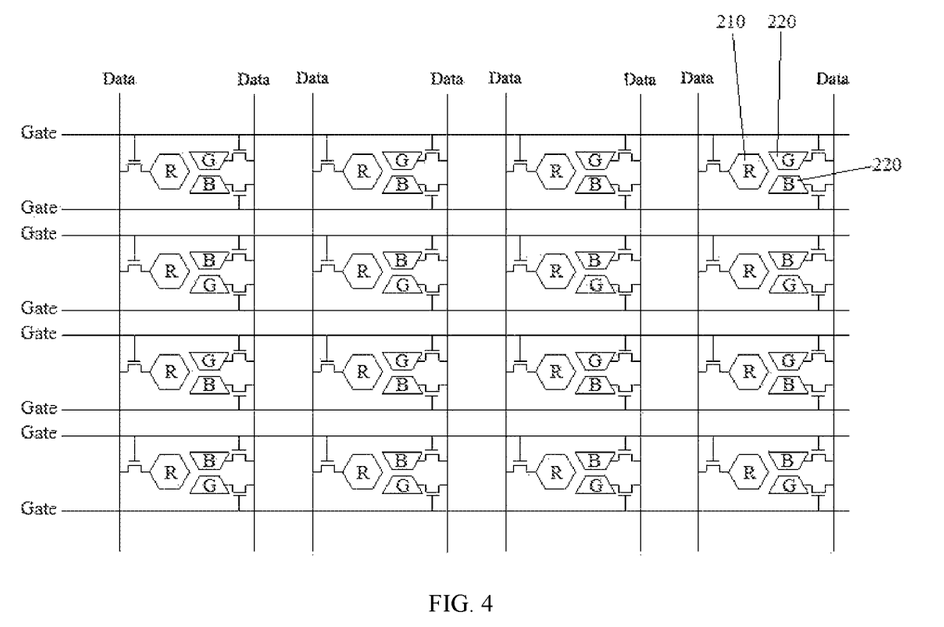
FIG. 4 is a schematic diagram of traces of a pixel architecture according to an embodiment of this application.

As shown in FIG. 4, the pixel architecture may be connected to a data signal line (Data) and a switch signal line (Gate) through an active switch. In an embodiment, the active switch may be a thin film transistor. The first sub-pixel 210 in each pixel cell 200 in a same column direction is connected to a same data signal line through the active switch, and the two second sub-pixels 220 in each pixel cell 200 in the same column direction are connected to another data signal line through an active switch. The two second sub-pixels 220 in each pixel cell 200 in the same column direction share one data signal line, so that a quantity of data signal lines in the pixel architecture can be reduced, and the costs of the pixel architecture can be reduced.

In an embodiment, the first sub-pixel 210 and one second sub-pixel 220 in each pixel cell 200 in a same row direction are connected to a same switch signal line through an active switch, and the other second sub-pixel 220 in each pixel cell 200 in the same row direction is connected to another switch signal line through an active switch. The first sub-pixels 210 and one second sub-pixel 220 in each pixel cell 200 in the same row direction share a switch signal line, so that a quantity of switch signal lines in the pixel architecture can be reduced, and the costs of the pixel architecture can be reduced. In addition, because the production costs of a data signal line are generally higher than those of a switch signal line. Therefore, the costs of the pixel architecture can further be reduced.

This embodiment further provides a display substrate, and in particular, a color filter substrate. The display substrate uses the foregoing pixel architecture to display colors.

This embodiment further provides a display, and in particular, a liquid crystal display. The display structurally includes the foregoing display substrate.

For the pixel architecture, the display substrate, and the display provided in the embodiments of this application, light rays that are emitted separately by three sub-pixels in a same pixel cell can enter human eyes from a same distance, so that a color combination effect of human eyes is improved, and a color difference between a picture seen by human eyes and an actual picture is reduced. Light rays that are emitted separately by three regularly hexagonal regions that are disposed adjacently to each other and represent different colors not only can enter human eyes from distances that are completely the same but also can enter human eyes from angles that are completely the same. The pixel architecture has a simple wiring design, helping to reduce the costs.

The above descriptions are merely optional embodiments of this application, and are not intended to limit this application. It should be understood by a person skilled in the art that various modifications and variations can be made to this application. Any modification, equivalent replacement, or improvement made without departing from the spirit and principle of this application shall fall within the scope as defined by the appended claims of this application.

What is claimed is:

1. A pixel architecture, comprising:
    a plurality of pixel cell groups, disposed in parallel in a row direction;
    wherein each of the pixel cell groups comprises:
    a plurality of pixel cells, disposed in parallel in a column direction perpendicular to the row direction, wherein each of the pixel cells comprises one first sub-pixel and two second sub-pixels;
    the color of the first sub-pixel and the color of the second sub-pixels are different from each other in each of the pixel cells, and the colors of the two second sub-pixels in each of the pixel cells are different from each other;
    the first sub-pixels in the same one pixel cell group are disposed adjacently in sequence in the column direction;
    the second sub-pixels in the same one pixel cell group are disposed adjacently in sequence in the column direction; and
    in the same one pixel cell group, one second sub-pixel in each of the pixel cells has same color with another second sub-pixel in another adjacent pixel cell;
    wherein in the same one pixel cell, the first sub-pixel is red sub-pixel, the two second sub-pixels are green sub-pixel and blue sub-pixel, wherein an area ratio of the red sub-pixel to the green sub-pixel and blue sub-pixel is 2:1:1;
    wherein in each pixel cell at an odd row, the red sub-pixel is arranged on the left, the green sub-pixel and blue sub-pixel are arranged on the right and abreast adjoined to each other along a column direction, the green sub-pixel is located on the top, and the blue sub-pixel is located on the bottom;
    wherein in each pixel cell at an even row, the red sub-pixel is arranged on the left, the green sub-pixel and blue sub-pixel are arranged on the right and abreast adjoined to each other along a column direction, the green sub-pixel is located on the bottom, and the blue sub-pixel is located on the top;
    wherein in each pixel cell at odd row, the green sub-pixel which is located at the top is adjoining to another green sub-pixel which is located at the bottom in an pixel cell at a previous row;
    wherein in each pixel cell at odd row, the blue sub-pixel which is located at the bottom is adjoining to another blue sub-pixel which is located at the top in an pixel cell at a next row.

2. The pixel architecture according to claim 1, wherein the shapes of the red sub-pixels are arranged as regular hexagons, the shapes of the green sub-pixels and the blue sub-pixels are arranged as isosceles trapezoids;
    wherein in each pixel cell at odd row, the green sub-pixel at the top and another green sub-pixel at the bottom in an pixel cell at a previous row are combined into a regular hexagon:
    wherein in each pixel cell at odd row, the blue sub-pixel at the bottom and another blue sub-pixel at the top in an pixel cell at a next row are combined into a regular hexagon, distances between geometric centers of any two of the regular hexagons are equal.

3. The pixel architecture according to claim 2, wherein in each of the pixel cells at the odd row, a top line of the red sub-pixel is coplaner with a top line of the green sub-pixel, a bottom line of the red sub-pixel is coplaner with a bottom line of the blue sub-pixel, a bottom line of the green sub-pixel directly resists with the top line of the blue sub-pixel.

4. The pixel architecture according to claim 1, wherein the shapes of the red sub-pixels are arranged as squares, the shapes of the green sub-pixels and the blue sub-pixels are arranged as rectangles, and wherein in each pixel cell at odd row, the green sub-pixel at the top and another green sub-pixel at the bottom in an pixel cell at a previous row are combined into a square;

wherein in each pixel cell at odd row, the blue sub-pixel at the bottom and another blue sub-pixel at the top in an pixel cell at a next row are combined into a square.

5. The pixel architecture according to claim 1, wherein the shapes of the red sub-pixels are arranged as rhombuses having a 60° angle, the shapes of the green sub-pixels and the blue sub-pixels are arranged as regular triangles, wherein in each pixel cell at odd row, the green sub-pixel at the top and another green sub-pixel at the bottom in an pixel cell at a previous row are combined into a rhombus having a 60° angle;

wherein in each pixel cell at odd row, the blue sub-pixel at the bottom and another blue sub-pixel at the top in an pixel cell at a next row are combined into a rhombus having a 60°.

6. The pixel architecture according to claim 1, wherein the first sub-pixels of the pixel cells in the same column direction are connected to same one data signal line through active switches, and the second sub-pixels of the pixel cells in the same column direction are connected to another data signal line through the active switches.

7. The pixel architecture according to claim 1, wherein the first sub-pixel and one second sub-pixel PM in each of the pixel cells in the same row direction are connected to same one switch signal line through an active switch, and the other second sub-pixel in each of the pixel cells in the same row direction is connected to another switch signal line through an active switch.

8. The pixel architecture according to claim 1, wherein in each of the pixel cells at the odd row, the red sub-pixel and the green sub-pixel are connected to a first switch signal line, the blue sub-pixel is connected to a second switch signal line, the first switch signal line is arranged above the pixel cells at an odd row, and the second switch signal line is arranged below the pixel cells at an odd row;

wherein in each pixel cell at an even row, the red sub-pixel and the blue sub-pixel are connected to a third switch signal line, the green sub-pixel is connected to a fourth switch signal line, the third switch signal line is arranged above the pixel cells at an even row, and the fourth switch signal line is arranged below the pixel cells at an even row;

wherein in the pixel cells at the odd row and the even row, the red sub-pixels are connected a first data signal line, the green sub-pixels and the blue sub-pixels are connected to a second data signal line, the first data signal line is arranged on the left of the corresponding pixel cell, and the second data signal line is arranged on the right of the corresponding pixel cells.

9. A display substrate, displaying colors through a pixel architecture, wherein the pixel architecture comprises:

a plurality of pixel cell groups, disposed in parallel in a row direction;

wherein each of the pixel cell groups comprises:

a plurality: of pixel cells, disposed in parallel in a column direction perpendicular to the row direction, wherein each of the pixel cells comprises one first sub-pixel and two second sub-pixels;

the color of the first sub-pixel and the color of the second sub-pixels are different from each other in each of the pixel cells, and the colors of the two second sub-pixels in each of the pixel cells are different from each other;

the first sub-pixels in the same one pixel cell group are disposed adjacently in sequence in the column direction;

the second sub-pixels in the same one pixel cell group are disposed adjacently in sequence in the column direction; and in the same one pixel cell group, one second sub-pixel in each of the pixel cells has same color with another second sub-pixel in another adjacent pixel cell;

wherein in each pixel cell at an odd row, the first sub-pixel and the one of second sub-pixel are connected to a first switch signal line, another second sub-pixel is connected to a second switch signal line, the first switch signal line is arranged above the pixel cells at an odd row, and the second switch signal line is arranged below the pixel cells at an odd row;

wherein in each pixel cell at an even row, the first sub-pixel and the one of second sub-pixel are connected to a third switch signal line, another second sub-pixel is connected to a fourth switch signal line, the third switch signal line is arranged above the pixel cells at an even row, and the fourth switch signal line is arranged below the pixel cells at an even row;

wherein in the pixel cells at the odd row and the even row, the first sub-pixels are connected a first data signal line, the two second sub-pixels are connected to a second data signal line, the first data signal line is arranged on the left cif the corresponding pixel cell, and the second data signal line is arranged on the right of the corresponding pixel cells.

10. The display substrate according to claim 9, wherein in the same one pixel cell, the first sub-pixel is red sub-pixel, the two second sub-pixels are green sub-pixel and blue sub-pixel, wherein an area ratio of the red sub-pixel to the green sub-pixel and blue sub-pixel is 2:1:1;

wherein in each pixel cell at an odd row, the red sub-pixel is arranged on the left, the green sub-pixel and blue sub-pixel are arranged on the right and abreast adjoined to each other along a column direction, the green sub-pixel is located on the top, and the blue sub-pixel is located on the bottom;

wherein in each pixel cell at an even row, the red sub-pixel is arranged on the left, the green sub-pixel and blue sub-pixel are arranged on the right and abreast adjoined to each other along a column direction, the green sub-pixel is located on the bottom, and the blue sub-pixel is located on the top;

wherein in each pixel cell at odd row, the green sub-pixel which is located at the top is adjoining to another green sub-pixel at the bottom in an pixel cell which is located at a previous row;

wherein in each pixel cell at odd row, the blue sub-pixel which is located at the bottom is adjoining to another blue sub-pixel which is located at the top in an pixel cell at a next row.

11. The display substrate according to claim 10, wherein the shapes of the red sub-pixels are arranged as regular hexagons, the shapes of the green sub-pixels and the blue sub-pixels are arranged as isosceles trapezoids;

wherein in each pixel cell at odd row, the green sub-pixel at the top and another green sub-pixel at the bottom in an pixel cell at a previous row are combined into a regular hexagon;

wherein in each pixel cell at odd row, the blue sub-pixel at the bottom and another blue sub-pixel at the top in an pixel cell at a next row are combined into a regular hexagon, distances between geometric centers of any two of the regular hexagons are equal.

12. The display substrate according to claim 10, wherein the shapes of the red sub-pixels are arranged as squares, the shapes of the green sub-pixels and the blue sub-pixels are arranged as rectangles, and wherein in each pixel cell at odd row, the green sub-pixel at the top and another green sub-pixel at the bottom in an pixel cell at a previous row are combined into a square;

wherein in each pixel cell at odd row, the blue sub-pixel at the bottom and another blue sub-pixel at the top in an pixel cell at a next row are combined into a square.

13. The display substrate according to claim 10, wherein the shapes of the red sub-pixels are arranged as rhombuses having a 60° angle, the shapes of the green sub-pixels and the blue sub-pixels are arranged as regular triangles, wherein in each pixel cell at odd row, the green sub-pixel at the top and another green sub-pixel at the bottom in an pixel cell at a previous row are combined into a rhombus having a 60° angle;

wherein in each pixel cell at odd row, the blue sub-pixel at the bottom and another blue sub-pixel at the top in an pixel cell at a next row are combined into a rhombus having a 60° angle.

14. The display substrate according to claim 10, wherein in each of the pixel cells at the odd row, a top line of the red sub-pixel is coplaner with a top line of the green sub-pixel, a bottom line of the red sub-pixel is coplaner with a bottom line of the blue sub-pixel, a bottom line of the green sub-pixel directly resists with the top line of the blue sub-pixel.

15. A display, comprising a display substrate, wherein the display substrate displays colors through a pixel architecture, and the pixel architecture comprises:

a plurality of pixel cell groups, disposed in parallel in a row direction;
   wherein each of the pixel cell groups comprising:
   a plurality of pixel cells, disposed in parallel in a column direction perpendicular to the row direction, wherein each of the pixel cells comprises one first sub-pixel and two second sub-pixels;
   the color of the first sub-pixel and the color of the second sub-pixels are different from each other in each of the pixel cells, and the colors of the two second sub-pixels in each of the pixel cells are different from each other;
   the first sub-pixels in the same one pixel cell group are disposed adjacently in sequence in the column direction;
   the second sub-pixels in the same one pixel cell group are disposed adjacently in sequence in the column direction; and
   in the same one pixel cell group, one second sub-pixel in each of the pixel cells has same color with another second sub-pixel in another adjacent pixel cell;
   wherein in the same one pixel cell, the color of the first sub-pixel is red, and the colors of the two second sub-pixels are respectively green and blue;
   wherein an area ratio of the first sub-pixels to the second sub-pixels is 2:1;
   wherein the shapes of the first sub-pixels are arranged as regular hexagons or squares or a rhombus having a 60° angle,
   when the shapes of the first sub-pixels are arranged as regular hexagons, the shapes of the second sub-pixels are arranged as isosceles trapezoids, one second sub-pixel in each of the pixel cells and another second sub-pixel in another adjacent pixel cell are combined into a regular hexagon, and among three regular hexagons that are disposed adjacently, distances between geometric centers of any two of the regular hexagons are equal, and
   when the shapes of the first sub-pixels are arranged as squares, the shapes of the second sub-pixels are arranged as rectangles, and one second sub-pixel in each of the pixel cells and another second sub-pixel in another adjacent pixel cell are combined into a square,
   when the shapes of the first sub-pixels are arranged as a rhombus having a 60° angle, the shapes of the second sub-pixels are arranged as regular triangles, and one second sub-pixel in each pixel cell and another second sub-pixel in another adjacent pixel cell are combined into a rhombus having a 60° angle.

16. The display according to claim 15, wherein the first sub-pixels of the pixel cells in the same column direction are connected to same one data signal line through active switches, and the second sub-pixels of the pixel cells in the same column direction are connected to another data signal line through the active switches.

17. The display according to claim 15, wherein the first sub-pixel and one second sub-pixel in each of the pixel cells in the same row direction are connected to same one switch signal line through an active switch, and the other second sub-pixel in each of the pixel cells in the same row direction is connected to another switch signal line through an active switch.

* * * * *